(12) United States Patent
Yasufuku

(10) Patent No.: US 11,372,783 B2
(45) Date of Patent: Jun. 28, 2022

(54) MEMORY SYSTEM AND METHOD

(71) Applicant: Kioxia Corporation, Tokyo (JP)

(72) Inventor: Kenta Yasufuku, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/198,676

(22) Filed: Mar. 11, 2021

(65) Prior Publication Data

US 2022/0092002 A1    Mar. 24, 2022

(30) Foreign Application Priority Data

Sep. 18, 2020 (JP) .............................. JP2020-156861

(51) Int. Cl.
G06F 13/16       (2006.01)
G06F 12/0871    (2016.01)
G06F 12/0891    (2016.01)

(52) U.S. Cl.
CPC ...... G06F 13/1642 (2013.01); G06F 12/0871 (2013.01); G06F 12/0891 (2013.01); G06F 13/1668 (2013.01)

(58) Field of Classification Search
None
See application file for complete search history.

(56) References Cited

U.S. PATENT DOCUMENTS

| | | | | |
|---|---|---|---|---|
| 7,979,593 B2 * | 7/2011 | Goodman | ............. | G06F 3/0632 710/5 |
| 2011/0055457 A1 * | 3/2011 | Yeh | ..................... | G06F 12/0246 711/E12.001 |
| 2017/0075834 A1 | 3/2017 | Cha et al. | | |
| 2019/0035445 A1 | 1/2019 | Huang | | |
| 2019/0243759 A1 | 8/2019 | Stonelake et al. | | |
| 2020/0021540 A1 | 1/2020 | Marolia et al. | | |
| 2020/0065290 A1 | 2/2020 | Natu | | |

OTHER PUBLICATIONS

NVM Express, "NVM™ Express Base Specification", Revision 1.4 a, Mar. 9, 2020, 405 pages.
Lender, "Compute Express Link™ (CXL™): A Coherent Interface for Ultra-High-Speed Transfers", DMTF Virtual APTS, Jul. 21, 2020, 25 pages.
Intel, "Intel 64 and IA-32 Architectures Software Developer's Manual: MOVDIR64B-Move 64 Bytes as Direct Store", vol. 2B, Instruction Set Reference, M-U, Sep. 2016, 2 pages.
Intel, "Intel 64 and IA-32 Architectures Software Developer's Manual: SFENCE—Store Fence" Instruction Set Reference, M-U, vol. 2B, Sep. 2016, 1 page.

* cited by examiner

*Primary Examiner* — Charles J Choi
(74) *Attorney, Agent, or Firm* — Oblon, McClelland, Maier & Neustadt, L.L.P.

(57) ABSTRACT

According to an embodiment, a memory system includes a controller which includes an interface connectable with a host with cache coherency kept. The controller is configured to: before the host writes a command to an I/O submission queue, read the I/O submission queue; after the reading, detect via the interface an invalidation request, the invalidation request being based on writing of the command by the host to the I/O submission queue; and in response to the invalidation request, acquire the command in the I/O submission queue.

20 Claims, 4 Drawing Sheets

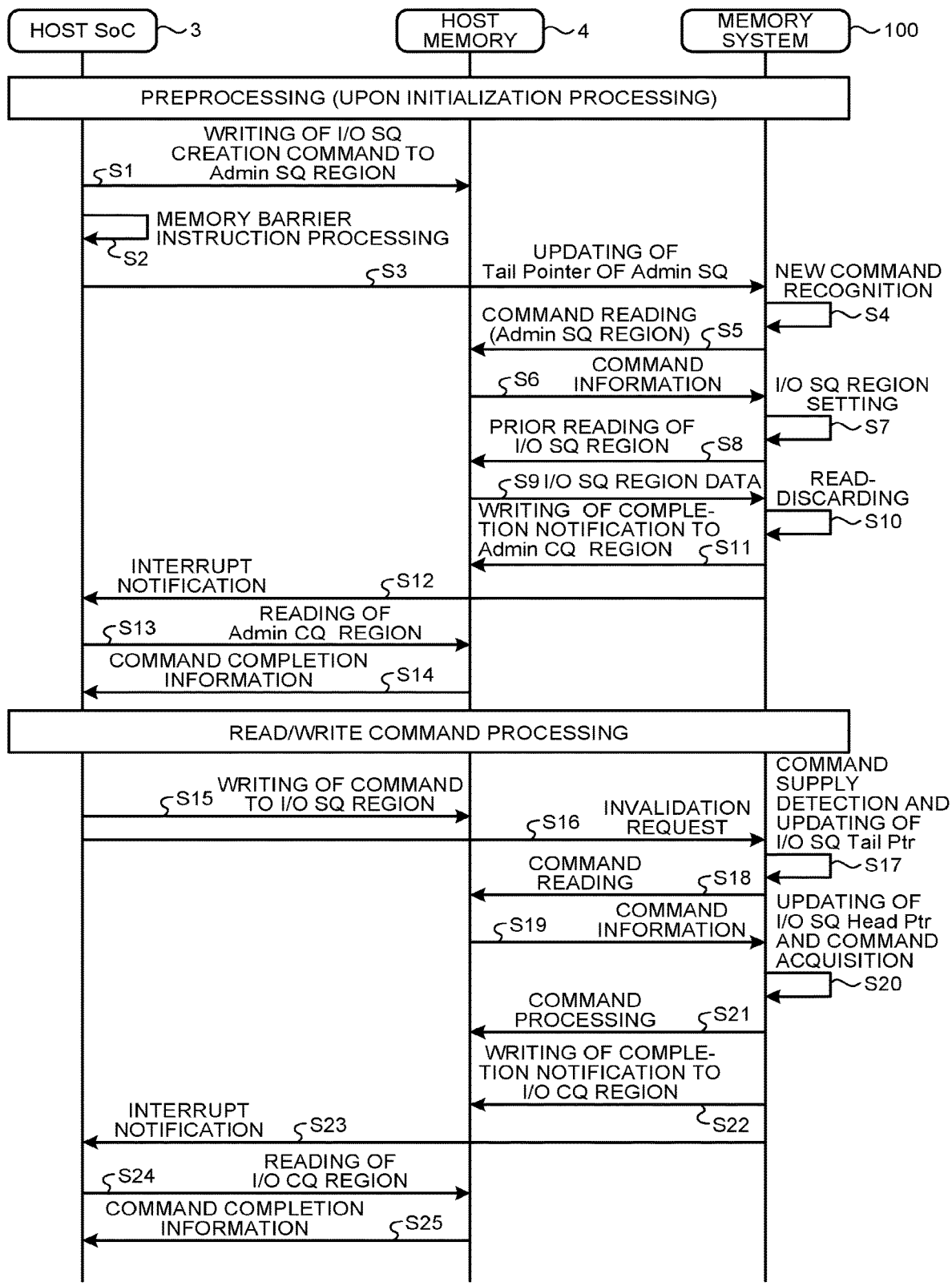

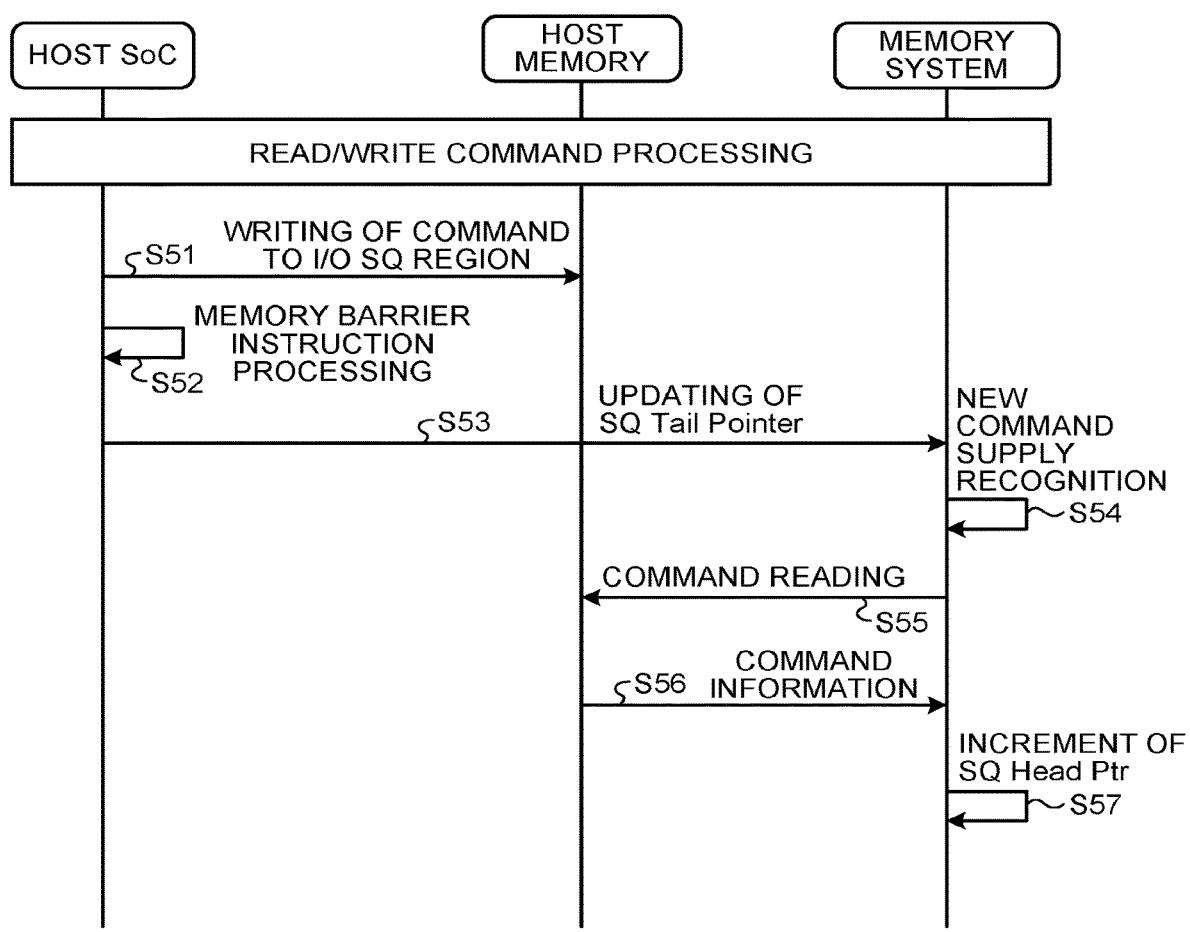

MEMORY SYSTEM AND METHOD

CROSS-REFERENCE TO RELATED APPLICATION

This application is based upon and claims the benefit of priority from Japanese Patent Application No. 2020-156861, filed on Sep. 18, 2020; the entire contents of which are incorporated herein by reference.

FIELD

An embodiment described herein relates generally to a memory system and a method.

BACKGROUND

In a system which includes a host and a storage device, when the host registers a command in an SQ region which is a submission queue, in response to this, the storage device acquires the command. In this case, it is desired that the command is acquired with low latency.

BRIEF DESCRIPTION OF THE DRAWINGS

FIG. 4 is a sequence diagram illustrating operation of an information processing system which includes the memory system according to the embodiment; and FIG. 5 is a sequence diagram explaining a procedure of command acquisition processing in a comparative example.

DETAILED DESCRIPTION

According to an embodiment, a memory system includes a controller which includes an interface connectable with a host with cache coherency kept. The controller is configured to: before the host writes a command to an I/O submission queue, read the I/O submission queue; after the reading, detect via the interface an invalidation request, the invalidation request being based on writing of the command by the host to the I/O submission queue; and in response to the invalidation request, acquire the command in the I/O submission queue.

Hereinafter, a memory system and a method according to an embodiment will be described in detail with reference to the accompanying drawings. Note that the present invention is not limited by the embodiment.

Embodiment

Figure 1:
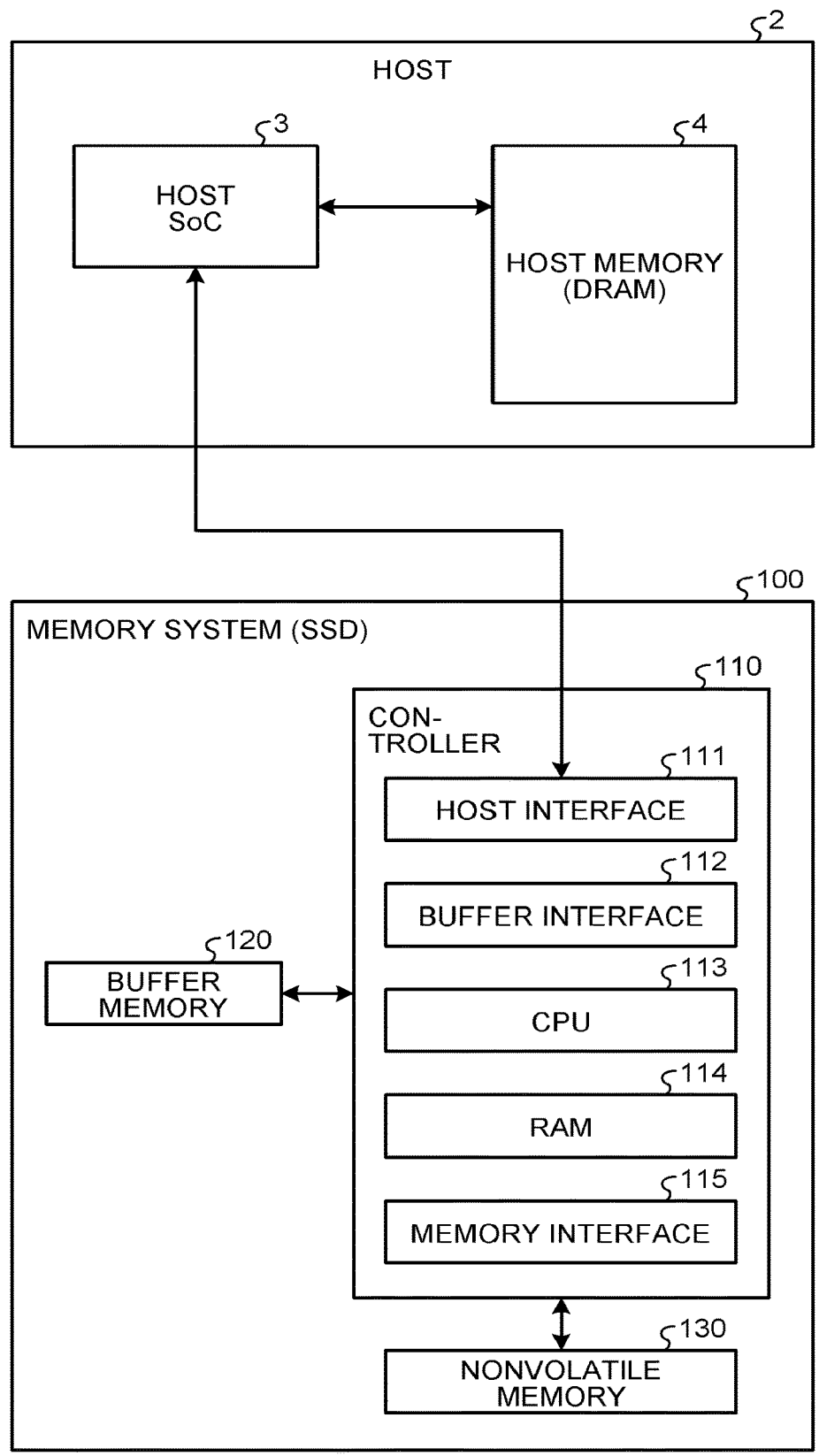
FIG. 1 is a diagram illustrating a configuration of an information processing system which includes a memory system according to an embodiment.

FIG. 1 is a diagram illustrating a configuration of an information processing system 1 which includes a memory system 100 according to the embodiment.

The memory system 100 is communicably connected to a host 2 and functions as an external storage device for the host 2. The memory system 100 is a flash memory for embedded use in conformity with a Universal Flash Storage (UFS) standard or an embedded Multi Media Card (eMMC) standard, a Solid State Drive (SSD), or the like. The host 2 is, for example, a microprocessor, an imaging device, or the like. Hereinafter, a case in which the host 2 and the memory system 100 can transmit and receive a packet in conformity with a Non-Volatile Memory express (NVMe) (registered trademark) standard via a communication path will be illustrated as an example.

The host 2 has a host System on Chip (SoC) 3 and a host memory 4. The host SoC3 has a CPU and performs processing required to issue a request to the memory system 100. For example, the host SoC3 writes a command for creasing a queue and a command for data updating or the like to the host memory 4 and performs reading and writing data in a control register of the memory system 100.

In addition, the host SoC3 has an interface in conformity with a protocol, such as a Compute Express Link (CXL) (registered trademark) protocol, which guarantees cache coherency. The host SoC3 monitors access to the host memory 4 from the host SoC3 itself and the memory system 100 for tracking memory states. In accordance with the states, the host SoC3 issues a request to keep the cache coherency to the memory system 100. For example, when the host SoC3 performs writing to a region of the host memory 4, which is read by using a request (a Rd Share request of CXL.Cache) which indicates that the memory system 100 performs reading share, the host SoC3 transmits an invalidation request (a SnvInv request of CXL. Cache) of corresponding data to the memory system 100 by a function of the above-mentioned interface (for example, a bridge function of the CXL standard).

Figure 2:
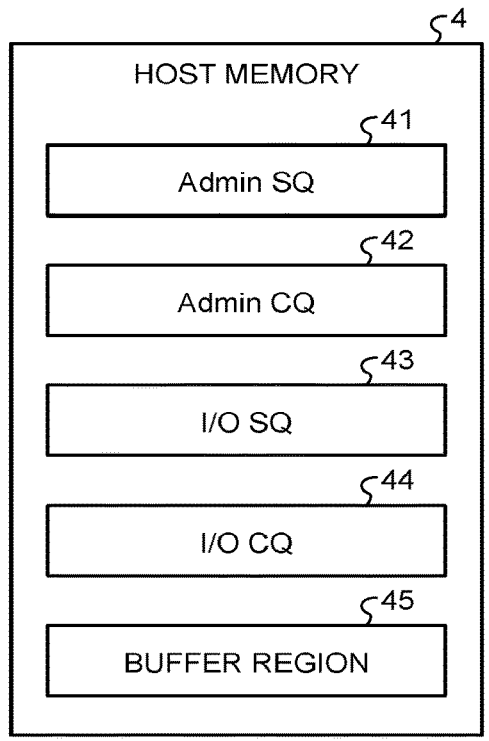
FIG. 2 is a diagram illustrating one example of a configuration of a host memory according to the embodiment.

The host memory 4 is, for example, a memory such as a Dynamic Random Access Memory (DRAM). Here, with reference to FIG. 2, one example of a configuration of the host memory 4 will be described. FIG. 2 is a diagram illustrating one example of the configuration of the host memory 4 according to the embodiment. As illustrated in FIG. 2, the host memory 4 includes Admin SQ 41, Admin CQ 42, I/O SQ 43, I/O CQ 44, and a buffer region 45. The Admin SQ 41 is a management command submission queue. The Admin CQ 42 is a management command completion queue. The I/O SQ 43 is an I/O command submission queue and a submission queue as to data transfer. The I/O CQ 44 is a command completion queue as to the data transfer. The buffer region 45 has stored therein write data corresponding to a write command enqueued to the I/O SQ 43 and read data corresponding to a read command.

As described above, each of the queue of the management command and the I/O command queue is configured with a pair of the submission queue and the completion queue. The submission queue is a queue which has stored therein a command submitted from the host 2 to the memory system 100. The completion queue is a queue in which when the memory system 100 completes execution of a command received via the submission queue, notification of execution completion of the above-mentioned command is stored by the memory system 100. The host 2 can learn the completion of the execution of the command by confirming the notification stored in the completion queue.

Each of the submission queue and the completion queue is a ring buffer as one example. An entry which each of the queues (each of the submission queue and the completion queue) includes is managed by two variables which are Head and Tail. Based on locations which Head and Tail indicate (a head pointer and a tail pointer), the host 2 or the memory system 100 can identify a reference location of each of the queues (for example, a location of newly enqueued command information).

With reference back to FIG. 1, the memory system 100 has a controller 110, a buffer memory 120, and a nonvolatile memory 130. The controller 110 has a host interface 111, a buffer interface 112, a CPU 113, a Random Access Memory (RAM) 114, and a memory interface 115.

The nonvolatile memory 130 can include a plurality of memory chips. Each of the memory chips has a memory cell array. In the memory cell array of each of the memory chips, a unit with which access for collective writing and reading of data is enabled is a physical page. A physical block includes a plurality of physical pages and is a minimum access unit with which data can be independently erased. It is supposed that data in the nonvolatile memory 130 is managed by the CPU 113 by using a cluster which is a data management unit smaller than a unit of one physical page. A cluster size is equal to or greater than a size of a sector which is a minimum access unit from the host 2 and it is defined that a natural number multiple of the cluster size is a physical page size. One physical page can include four clusters and one logical page can include 64 clusters.

For example, a size of the above-mentioned writing unit may be a cluster size, a page size, a block size, and a size different from the cluster size, the page size, and the block size. The cluster size may be 4 KB and the page size may be 16 KB.

The nonvolatile memory 130 is, for example, a NAND type flash memory and may be other nonvolatile semiconductor memory such as a NOR type flash memory, a Magnet Resistive Random Access Memory (MRAM), a Phase-change Random Access Memory (PRAM), a Resistive Random Access Memory (ReRAM), and a Ferroelectric Random Access Memory (FeRAM). In addition, the nonvolatile memory 130 may also be a memory having a three-dimensional structure.

The host SoC3 and the host interface 111 operate in accordance with a protocol specified by the NVMe standard. In addition, each of the host SoC3 and the host interface 111 also has an interface in conformity with a protocol, such as a CXL protocol, which guarantees the cache coherency. Note that besides the CXL protocol, the protocol which the above-mentioned interface is in conformity with may be a Cache Coherent Interconnect for Accelerators (CCIX) protocol or an Open Coherent Accelerator Processor Interface (OpenCAPI) (a registered trademark) protocol. Note that in a case of the CXL protocol, it is required to support CXL.cache in addition to CXL.io.

The CPU 113 controls each of units included in the controller 110 in an overall manner. The CPU 113 acquires a variety of commands, for example, via the host interface 111 and upon acquiring each of the variety of commands, performs processing in accordance with the acquired command.

The RAM 114 is a memory and functions as a working area by the CPU 113.

The buffer memory 120 functions as a memory area which temporarily holds information. The buffer memory 120 is, for example, a general-purpose memory such as a Static Random Access Memory (SRAM) and a Dynamic Random Access Memory (DRAM). In addition, the buffer memory 120 may be installed inside the controller 110 or may be installed outside the controller 110, independently from the controller 110.

The memory interface 115 is connected to the nonvolatile memory 130 via a bus and controls communication with the nonvolatile memory 130. For example, when instructed to execute a write command from the CPU 113, the memory interface 115 transfers a write request and write data to the nonvolatile memory 130. In addition, upon completing write processing, the nonvolatile memory 130 transmits completion notification to the memory interface 115, and the memory interface 115 receives the completion notification from the nonvolatile memory 130. When instructed to execute a read command from the CPU 113, the memory interface 115 transfers a read request to the nonvolatile memory 130, and the nonvolatile memory 130 transmits read data to the memory interface 115, and the memory interface 115 receives the read data from the nonvolatile memory 130.

When having received, via the memory interface 115, the completion notification for the write request instructed by the CPU 113, the CPU 113 registers completion information indicating execution completion of the write command via the host interface 111 in the I/O CQ 44 in the host memory 4. In a case of a read request, the CPU 113 transfers read data via the host interface 111 to the buffer region in the host memory 4 and registers completion information indicating execution completion of a read command via the host interface 111 in the I/O CQ 44 in the host memory 4.

The buffer interface 112 is a controller which controls access to the buffer memory 120 from the controller 110 and is a controller which enables the access to the buffer memory 120 at, for example, a Double Data Rate (DDR). The CPU 113 stores, in the buffer memory 120, the write data transferred to the nonvolatile memory 130 and the read data outputted by the nonvolatile memory 130 as needed and performs data transfer via the host interface 111 between the buffer memory 120 and the host memory 4.

Figure 3:
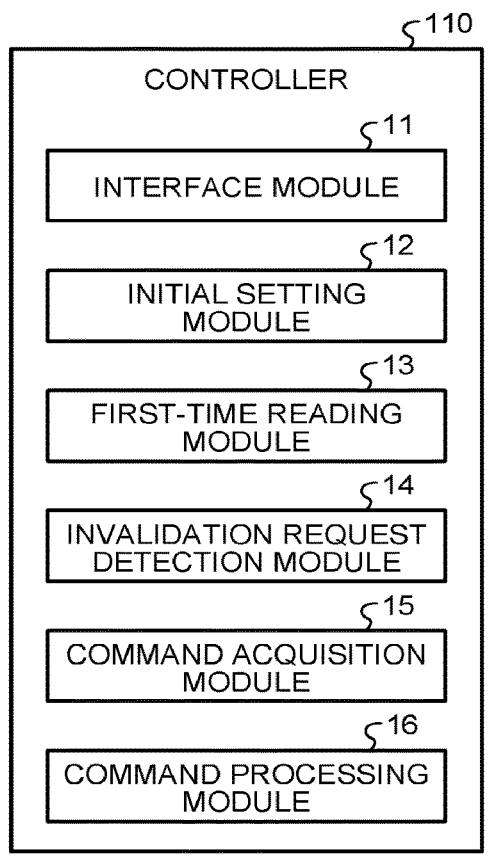
FIG. 3 is a block diagram illustrating one example of a function configuration of a controller according to the embodiment.

Subsequently, with reference to FIG. 3, functions of the controller 110 will be described. FIG. 3 is a block diagram illustrating one example of a function configuration of the controller 110 according to the embodiment. As illustrated in FIG. 3, the controller 110 includes an interface module 11, an initial setting module 12, a first-time reading module 13, an invalidation request detection module 14, a command acquisition module 15, and a command processing module 16. The CPU 113 executes a program and the like stored in the nonvolatile memory 130 and realizes the initial setting module 12, the first-time reading module 13, and the command processing module 16 by controlling the host interface 111, the buffer interface 112, and the memory interface 115. In addition, the invalidation request detection module 14 and the command acquisition module 15 are realized by functions implemented in the host interface 111.

The interface module 11 is an interface (for example, an interface in conformity with the CXL standard) which connects to the host 2 with the cache coherency kept and is realized by the host interface 111.

The initial setting module 12 is an element which performs setting processing as to initialization processing. Here, the initialization processing is preprocessing executed in a case where a power source of the host 2 is turned on, a case where a power source of the memory system 100 is turned on, a case where the memory system 100 is restored from a sleep state, or other case.

The sleep state of the memory system 100 is, for example, a state in which a power source of at least one part of circuitry and memories included in the memory system 100 is turned off in order to save power consumption of the memory system 100. As a method of realizing the sleep state of the memory system 100, for example, there are a method in which the controller 110 stores predetermined information stored in the RAM 114 and the buffer memory 120 into the nonvolatile memory 130 and thereafter, a power source of the memory system 100 is turned off and a method in which the controller 110 stores predetermined information stored in the RAM 114 and the buffer memory 120 into a memory circuit, among memory circuits included in the controller 110, whose power consumption is small and thereafter, power sources of the circuits and the memories included in the memory system 100, other than the memory circuit whose power consumption is small, are turned off.

As one initialization processing, for example, there is creation of the I/O SQ 43. When detecting that the tail pointer of the Admin SQ 41 is updated by writing processing performed by the host 2, the initial setting module 12 recognizes that a new command has been registered on the Admin SQ 41. The initial setting module 12 acquires information of the above-mentioned new command from the host memory 4 and analyzes the new command. When as a result of analyzing the new command, determining that the new command is a creation command of the I/O SQ 43, the initial setting module 12 performs region setting processing for the I/O SQ 43. In this region setting processing for the I/O SQ 43, an address and a size of a region for the I/O SQ 43 are set to the host interface 111, thereby allowing the subsequent invalidation request detection module 14 and command acquisition module 15 to issue a request to the I/O SQ 43 on the host memory 4.

After the region setting processing for the I/O SQ 43 by the initial setting module 12, the first-time reading module 13 executes processing of reading the above-mentioned I/O SQ 43. After the region setting processing for the I/O SQ 43 and before command writing to the I/O SQ 43 by the host 2, the first-time reading module 13 reads the I/O SQ 43. The first-time reading module 13 reads the I/O SQ 43 by using a request (a RdShare request of CXL.Cache), whereby the host SoC3 of the host 2 recognizes that the memory system 100 references the I/O SQ 43 and stores the referencing of the I/O SQ 43 made by the memory system 100. When in subsequent processing, writing to the I/O SQ 43 occurs, the host SoC3 issues an invalidation request of corresponding data to the memory system 100. In addition, since read information does not indicate valid command information, the first-time reading module 13 discards the read information at predetermined timing.

After the reading made by the first-time reading module 13, the invalidation request detection module 14 is an element which detects, via the interface module 11, an invalidation request (a SnvInv request of CXL.Cache) generated by command writing to the I/O SQ 43 made by the host SoC3. In response to the above-mentioned invalidation request, the invalidation request detection module 14 detects writing to the I/O SQ 43 and updates the tail pointer of the I/O SQ 43. The invalidation request detection module 14 is realized by a circuit inside the host interface 111.

The command acquisition module 15 is an element which acquires command information of the I/O SQ 43 in response to the invalidation request detected by the invalidation request detection module 14. In order to acquire the command information, as with the first-time reading module 13, by performing reading by using a request (a RdShare request of CXL.Cache) which indicates reading share, the host SoC3 of the host 2 recognizes that the memory system 100 references the latest data at that point in time. The command acquisition module 15 is realized by a circuit inside the host interface 111.

The command processing module 16 is an element which processes a request of the host which the command acquired by the command acquisition module 15 indicates. The CPU 113 controls the host interface 111, the buffer interface 112, and the memory interface 115 as needed and performs data transfer between the host memory 4 and the nonvolatile memory 130.

Next, with reference to FIG. 4, operation of the information processing system 1 which includes the memory system 100 will be described. FIG. 4 is a sequence diagram illustrating the operation of the information processing system 1 which includes the memory system 100, according to the embodiment. First, in the information processing system 1, in step S1 to step S14, initialization processing is first executed. Note that operation illustrated in FIG. 4 is operation which is unique to the information processing system 1 and in order to operate the memory system 100, operations of initialization processing other than those illustrated in FIG. 4, which are not unique to the information processing system 1, are required. These processes are conducted at appropriate timing before and after the initialization processing illustrated in FIG. 4. In addition, although in FIG. 4, as command processing, a read command and a write command are described as examples, also as to commands other than the read command and the write command, command inputting between the host SoC3 and the memory system 100 and a procedure of the command completion are similar thereto and the CPU 113 performs control in accordance with necessity, thereby appropriately processing a request of the host by the command.

The host SoC3 of the host 2 writes a creation command of the I/O SQ 43 to the Admin SQ 41 (step S1), executes a memory barrier instruction (for example, a SFENCE instruction implemented in a CPU manufactured by Intel Corporation) (step S2), and updates a tail pointer of the Admin SQ 41 (step S3). The memory barrier instruction is an instruction needed to guarantee order of writing to the Admin SQ 41 and updating of the tail pointer of the Admin SQ 41 (step S3). The host SoC3 updates the tail pointer of the Admin SQ 41, whereby the initial setting module 12 recognizes that a new command has been registered (step S4). In accordance with the recognition, the initial setting module 12 accesses the host memory 4 and makes a request to read a command (step S5) and acquires command information from the host memory 4 (step S6). Based on the acquired command information, the initial setting module 12 performs setting processing for the I/O SQ 43 (step S7). The initial setting module 12 can set an address and a size of the I/O SQ 43 by performing this setting processing.

After the above-mentioned setting processing, the first-time reading module 13 accesses the host memory 4 and transmits a request to read the whole region of the I/O SQ 43 to the host 2 (step S8). The first-time reading module 13 transmits, for example, a request (a RdShare request) multiple times, which is a request for reading data having a 64-bytes length corresponding to a command length and a cache management unit, and which indicates reading share of a CXL.Cache. The first-time reading module 13 acquires data of the I/O SQ 43 from the host memory 4 (step S9). As described above, prior to writing of the command (for example, the write command and the read command) to the I/O SQ 43 made by the host SoC3, which is executed after finishing the initialization processing, the first-time reading module 13 reads the data of the I/O SQ 43. Note that based on the address and the size of the I/O SQ 43, which is set by the initial setting module 12, the first-time reading module 13 processes reading.

The first-time reading module 13 discards the acquired data of the I/O SQ 43 (step S10). As described above, the first-time reading module 13 dummy reads the I/O SQ 43. The initial setting module 12 writes completion notification to the Admin CQ 42 of the host memory 4 (step S11) and notifies the host SoC3 of an interrupt (step S12).

The host SoC3 reads information of the Admin CQ (step S13) and acquires command completion information (step S14). The processes up to here correspond to the initialization processing.

The host SoC3 writes the command to the I/O SQ 43 (step S15). As a result of this, updating of the I/O SQ 43 read by the first-time reading module 13 occurs, and the host SoC3 issues an invalidation request to the memory system 100 by a CXL-standard coherency bridge function of the host SoC3 (step S16). For example, the host SoC3 transmits the invalidation request (a SnvInv request) of CXL.Cache. In addition, this invalidation request includes address information which indicates a location where the host SoC3 writes the command (for example, the write command or the read command) in step S15. When the host SoC3 writes the command to the I/O SQ 43, it is required to atomically perform the writing by one instruction in which pieces of data including the command information are collected, and it is required to use, for example, an AVX-512 store instruction which is implemented in a CPU manufactured by Intel Corporation.

The invalidation request detection module 14 of the memory system 100 detects, via the interface module 11, the invalidation request issued by the host SoC3. In addition, the invalidation request detection module 14 references the address information included in the information of the above-mentioned invalidation request and based on the address information, updates a tail pointer of the I/O SQ 43 (step S17).

Based on the updated tail pointer of the I/O SQ 43, the command acquisition module 15 issues a command reading request to the host memory 4 (step S18) and acquires command information from the host memory 4 (step S19). The command acquisition module 15 acquires the command information and updates a head pointer of the I/O SQ 43 (step S20).

In accordance with contents which the acquired command information indicates, the command processing module 16 executes command processing (step S21). In step S21, when the acquired command information indicates the read command, based on the contents of the command information, the command processing module 16 reads corresponding data from the nonvolatile memory 130 and transfers the data to the host memory 4.

In addition, when the acquired command information indicates the write command, in step S21, the command processing module 16 acquires write data from the host memory 4 and based on contents of the command information, writes the acquired write data to a corresponding location of the nonvolatile memory 130.

Upon completing the processing of the command, the command processing module 16 writes completion notification to the I/O CQ 44 of the host memory 4 (step S22) and notifies the host SoC3 of an interrupt (step S23).

In response to the notification of the interrupt, the host SoC3 reads the I/O CQ 44 of the host memory 4 (step S24) and acquires command completion information from the host memory 4 (step S25), finishing the processing.

As described above, in the embodiment, the interface module 11 connects to the host 2 with the cache coherency kept. Prior to the command writing to the I/O SQ 43 made by the host 2, the first-time reading module 13 reads the I/O SQ 43. After the reading made by the first-time reading module 13, the invalidation request detection module 14 detects, via the interface module 11, the invalidation request that is based on the command writing to the I/O SQ 43 made by the host 2 and in response to the invalidation request, the command acquisition module 15 acquires a command of the I/O SQ 43. As described above, without detecting updating of the tail pointer of the I/O SQ 43 by the host 2, the controller 110 acquires the command information, thus allowing the command to be acquired with low latency.

As a technology (referred to as a comparative example) which is compared with the technology in the embodiment, there is a technology in which a host SoC writes a command to an I/O SQ and further, the host updates an I/O SQ tail pointer. Here, with reference to FIG. 5, a procedure of command acquisition processing in the comparative example will be described. FIG. 5 is a sequence diagram explaining a procedure of command acquisition processing in a comparative example.

It is premised that creation of the I/O SQ has been completed. First, a host SoC writes the command to the I/O SQ (step S51) and executes a memory barrier instruction (step S52). This memory barrier instruction is an instruction which guarantees order of writing to the I/O SQ and updating of the I/O SQ tail pointer. Subsequently, the host SoC updates the I/O SQ tail pointer (step S53).

Based on updating of the I/O SQ tail pointer, a memory system recognizes new command supply (step S54), issues a request to read the command of the I/O SQ to a host memory (step S55), and acquires command information (step S56). The memory system increments a head pointer of the I/O SQ (step S57).

According to the comparative example, a delay up to when the memory system starts to read the command occurs due to the time required for updating the tail pointer of the I/O SQ made by the host SoC (step S53 in FIG. 5) and the time required for executing the instruction (step S52 in FIG. 5) which guarantees the order of processing.

In contrast to the comparative example, according to the embodiment, since after the invalidation request has been detected, the memory system 100 updates the I/O SQ tail pointer, it is not required for the host SoC3 to update the tail pointer and it is also not required for the host SoC3 to execute the instruction which guarantees the order of processing. Hence, as compared with the comparative example, the command can be acquired with low latency.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A memory system comprising:
a controller including an interface connectable with a host with cache coherency kept, the controller being configured to:
before the host writes a command to an I/O submission queue, read the I/O submission queue;
after the reading, detect via the interface an invalidation request, the invalidation request being based on writing of the command by the host to the I/O submission queue; and
in response to the invalidation request, acquire the command in the I/O submission queue.

2. The memory system according to claim 1, wherein after setting the I/O submission queue in initial setting, the controller is configured to perform the reading.

3. The memory system according to claim 2, wherein the initial setting is setting processing as to initialization processing.

4. The memory system according to claim 3, wherein the initialization processing is performed upon turning on a power source of the memory system.

5. The memory system according to claim 1, wherein in response to the invalidation request, the controller is configured to update a tail pointer of the I/O submission queue.

6. The memory system according to claim 1, wherein the controller is configured to discard the read data.

7. The memory system according to claim 1, wherein
the interface is in conformity with a CXL standard, and
the controller is configured to transmit a read request of the CXL standard to the host and read the I/O submission queue.

8. The memory system according to claim 7, wherein the controller is configured to detect the invalidation request of the CXL standard.

9. The memory system according to claim 7, wherein the read request is a request to read data having a command length and a data length of a cache management unit.

10. The memory system according to claim 9, wherein the controller is configured to transmit the read request multiple times.

11. A method of controlling a memory system connectable with a host, the method comprising:
connecting to the host with cache coherency kept;
before the host writes a command to an I/O submission queue, reading the I/O submission queue;
after the reading, detecting an invalidation request, the invalidation request being based on writing of the command by the host to the I/O submission queue; and
in response to the invalidation request, acquiring the command written to the I/O submission queue.

12. The method according to claim 11, wherein after setting the I/O submission queue in initial setting, the reading is performed.

13. The method according to claim 12, wherein the initial setting is setting processing as to initialization processing.

14. The method according to claim 13, wherein the initialization processing is performed upon turning on a power source of the memory system.

15. The method according to claim 11, wherein in response to the invalidation request, the method further comprises updating a tail pointer of the I/O submission queue.

16. The method according to claim 11, wherein the method further comprises discarding the read data.

17. The method according to claim 11, wherein
the connecting to the host is in conformity with a CXL standard, and
the method further comprises transmitting a read request of the CXL standard to the host and reading the I/O submission queue.

18. The method according to claim 17, wherein the detecting includes detecting the invalidation request of the CXL standard.

19. The method according to claim 17, wherein the read request is a request to read data having a command length and a data length of a cache management unit.

20. The method according to claim 19, wherein the transmitting includes transmitting the read request multiple times.

\* \* \* \* \*